United States Patent
Chang et al.

(10) Patent No.: US 9,262,013 B2
(45) Date of Patent: Feb. 16, 2016

(54) OUT-CELL OPTICAL TOUCH DEVICE AND RELATED CALIBRATING METHOD

(71) Applicant: Wistron Corporation, New Taipei (TW)

(72) Inventors: Chun-Chao Chang, New Taipei (TW); Yu-Yen Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 79 days.

(21) Appl. No.: 14/231,760

(22) Filed: Apr. 1, 2014

(65) Prior Publication Data

US 2015/0009181 A1     Jan. 8, 2015

(30) Foreign Application Priority Data

Jul. 3, 2013   (TW) .............................. 102123801 A (51) Int. Cl.
G06F 3/042     (2006.01)
G06F 3/041     (2006.01)

(52) U.S. Cl.
CPC .............. *G06F 3/042* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 6,262,718 B1 * | 7/2001 | Findlay et al. | 345/178 |
| 6,456,952 B1 * | 9/2002 | Nathan | 702/94 |
| 8,373,680 B2 | 2/2013 | Chen | |
| 2006/0202969 A1 * | 9/2006 | Hauck | 345/173 |
| 2010/0309168 A1 * | 12/2010 | Huang | 345/175 |
| 2011/0285657 A1 * | 11/2011 | Shimotani et al. | 345/173 |
| 2012/0032903 A1 * | 2/2012 | Yamamoto et al. | 345/173 |
| 2012/0235956 A1 | 9/2012 | Wang | |

* cited by examiner

*Primary Examiner* — Joseph Haley
*Assistant Examiner* — Emily Frank
(74) *Attorney, Agent, or Firm* — Winston Hsu; Scott Margo (57) ABSTRACT

A calibrating method applied to an out-cell optical touch device relative to a display panel is disclosed. The calibrating method is suitable for the out-cell optical touch device that includes at least one signal sensor and at least two position sensors. The position sensors are respectively disposed on two adjacent sides of a frame of the out-cell optical touch device. The calibrating method includes acquiring a first value according to dimensions of the display panel, detecting a distance between the frame and sides of the display panel to acquire a second value, utilizing the first value and the second value to obtain an offset, and transforming touch coordinates detected by the signal sensor into screen coordinates applied for the display panel according to the offset.

19 Claims, 8 Drawing Sheets

OUT-CELL OPTICAL TOUCH DEVICE AND RELATED CALIBRATING METHOD

BACKGROUND OF THE INVENTION

1. Field of the Invention

The present invention relates to an out-cell optical touch device, and more particularly, to an out-cell optical touch device and a related calibrating method capable of automatically executing coordinate amendment.

2. Description of the Prior Art

User inputs the control command via the keyboard, the mouse and peripheral devices to control the display without touch panel. Conventional technology disposes an out-cell touch device on the display, the out-cell touch device detects an amount and a movement of touch point so that the display without the touch panel can be controlled by touch function. Because the out-cell touch device is manually installed on the display, position of the out-cell touch device relative to the display is inaccurate, and coordinate amendment is executed by the out-cell touch device to prevent deviation between the actual touch position and the ideal control position. The conventional coordinate amendment is that the user manually touches four calibration points on the out-cell touch device, so as to obtain calibration information to calculate coordinate transformation between the out-cell touch device and the display. However, the transformed touch coordinates generated by the conventional coordinate amendment may have obvious deviation when the user does not accurately touch the predetermined calibration point. Design of an out-cell touch device and a related calibrating method without manual touch of the calibration point, which is able to effectively prevent artificial error, is an important issue in the touch display industry.

SUMMARY OF THE INVENTION

The present invention provides an out-cell optical touch device and a related calibrating method capable of automatically executing coordinate amendment for solving above drawbacks.

According to the claimed invention, an calibrating method applied to an out-cell optical touch device is disclosed. The method is suitable for the out-cell optical touch device having at least one signal sensor and at least two position sensors. The position sensors are respectively disposed on two adjacent sides of a frame of the out-cell optical touch device. The calibrating method includes acquiring a first value according to dimensions of a display panel, detecting a distance between the frame and sides of the display panel to acquire a second value, utilizing the first value and the second value to obtain an offset, and transforming touch coordinates detected by the signal sensor into screen coordinates applied for the display panel according to the offset.

According to the claimed invention, the calibrating method of acquiring the first value according to the dimensions of the display panel further includes utilizing dimension difference between the frame and the display panel to acquire the first value when the dimensions of the display panel is known.

According to the claimed invention, the calibrating method utilizes a following formula to acquire the first value:

$$\begin{cases} d1 = \dfrac{W - w'}{2} \\ d2 = \dfrac{H - h'}{2} \end{cases}$$

wherein W, H respectively are a width and a height of the frame, w', h' respectively are a width and a height of the display panel, and d1, d2 are the first values respectively detected by the position sensors.

According to the claimed invention, an amount of the position sensor is four. The calibrating method of acquiring the first value according to the dimensions of the display panel further includes utilizing the four position sensors disposed on four sides of the frame to acquire distances between each side of the frame and a corresponding side of the display panel when the dimensions of the display panel is unknown, obtaining the dimensions of the display panel according to the distances, and acquiring the first value according to dimension difference between the frame and the display panel.

According to the claimed invention, the calibrating method utilizes a following formula to obtain the dimensions of the display panel:

$$\begin{cases} w' = W - (v2 + v4) \\ h' = H - (v1 + v3) \end{cases}$$

wherein w', h' respectively are a width and a height of the display panel, W, H respectively are a width and a height of the frame, and v1, v2, v3, v4 respectively are distances acquired by the four position sensors.

According to the claimed invention, the offset is a linear offset, and an amount of the position sensor is two. The calibrating method utilizes a following formula to obtain the offset:

$$\begin{cases} Xs = d2 - d2' \\ Ys = d1 - d1' \end{cases}$$

wherein Xs, Ys respectively are a first linear offset at a first direction and a second linear offset at a second direction, d1, d2 are the first values respectively detected by the position sensors, and d1', d2' are the second values respectively detected by the position sensors. The first direction is substantially perpendicular to the second direction.

According to the claimed invention, the calibrating method utilizes a following formula to transform the touch coordinates into the screen coordinates:

$$\begin{cases} x'' = \dfrac{(x - Xs) \times R}{w'} \\ y'' = \dfrac{(y - Ys) \times R}{h'} \end{cases}$$

wherein (x, y) are the touch coordinates, w', h' respectively are a width and a height of the display panel, R is resolution of the display panel, and (x", y") are the screen coordinates.

According to the claimed invention, the calibrating method utilizes the first value and the second value to obtain the rotary offset, and transforms the touch coordinates into the screen coordinates according to the rotary offset.

According to the claimed invention, the offset is a rotary offset, an amount of the position sensor is two, and the calibrating method utilizes a following formula to obtain the offset:

$$\theta = \tan^{-1}[2(d2 \times d1' - d1 \times d2')]$$

wherein d1, d2 are the first values respectively detected by the position sensors, d1', d2' are the second values respectively detected by the position sensors, and θ is the rotary offset.

According to the claimed invention, the calibrating method utilizes a following formula to transform the touch coordinates into the screen coordinates:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

wherein (x, y) are the touch coordinates, and (x", y") are the screen coordinates.

According to the claimed invention, the calibrating method further includes determining whether the distance is within a predetermined range, and transforming the touch coordinates into the screen coordinates when the distance is out of the predetermined range.

According to the claimed invention, the calibrating method further includes transforming the touch coordinates into the screen coordinates as waiting for a predetermined period.

According to the claimed invention, the offset comprises the rotary offset and the linear offset. The calibrating method transforms the touch coordinates into the screen coordinates according to the rotary offset and the linear offset.

According to the claimed invention, an out-cell optical touch device includes a frame, at least one signal sensor, at least two position sensors and a processor. The frame is movably disposed on a display panel. The at least one signal sensor is disposed on the frame to detect touch coordinates of an object within a detective area of the frame. The detective area is formed on an encircled zone of the frame. The at least two position sensors are respectively disposed on adjacent sides of the frame to detect distances between the frame and the display panel. The processor is electrically connected to the signal sensor and the position sensors. The processor obtains an offset of the frame relative to the display panel according to the distances, and transforms the touch coordinates into screen coordinates applied for the display panel according to the offset.

According to the claimed invention, each position sensor is substantially disposed on a middle of the corresponding side of the frame.

According to the claimed invention, the out-cell optical touch device further includes at least four position sensors respectively disposed on four sides of the frame. Each position sensor detects the distances between each side of the frame and a corresponding side of the display panel.

The out-cell optical touch device and the related calibrating method of the present invention utilizes the plurality of position sensors to measure the dimensions of the display panel and transforms the coordinates automatically. The coordinate amendment is actuated without manual operation by touching the calibration points. Therefore, the present invention can effectively prevent artificial error to increase precision of the coordinate amendment, and provide an automatic amendment function for preferred operational convenience of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
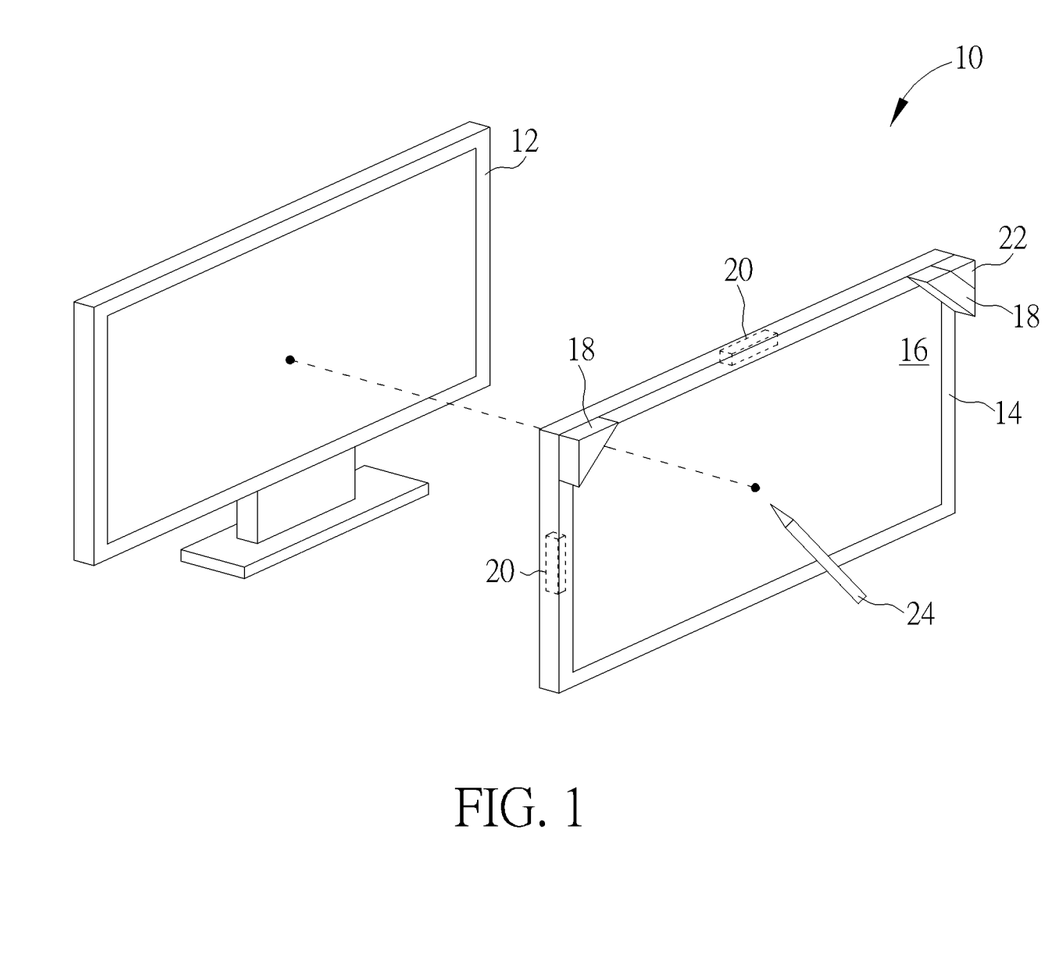
FIG. 1 is a diagram of an out-cell optical touch device according to an embodiment of the present invention.
Figure 2:
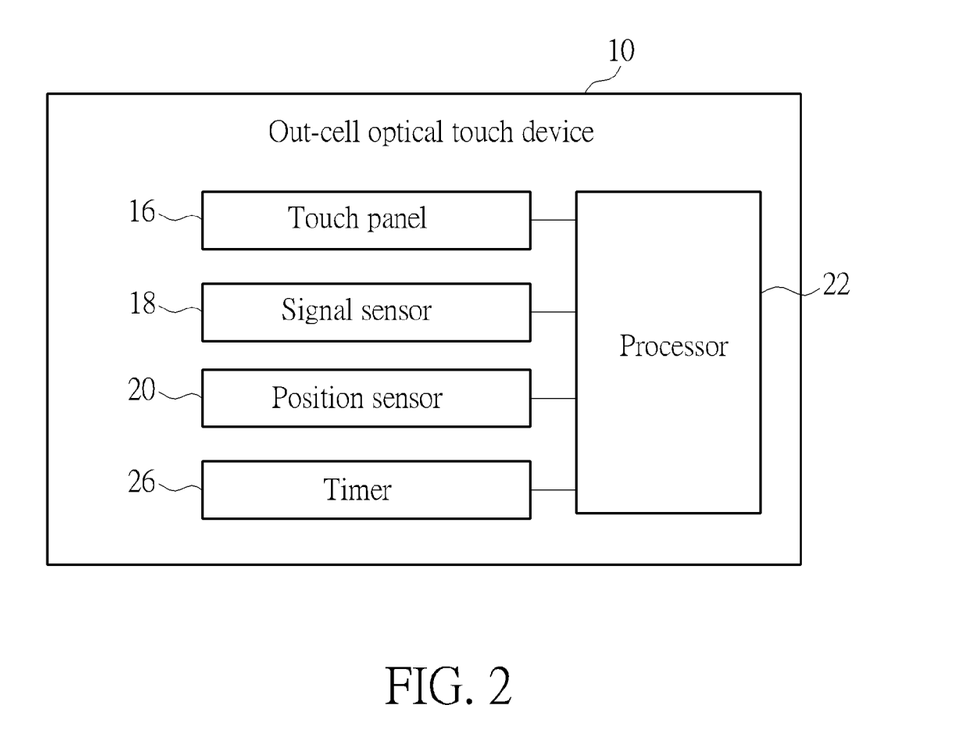
FIG. 2 is a functional block diagram of the out-cell optical touch device according to the embodiment of the present invention.

Please refer to FIG. 1 and FIG. 2. FIG. 1 is a diagram of an out-cell optical touch device 10 according to an embodiment of the present invention. FIG. 2 is a functional block diagram of the out-cell optical touch device 10 according to the embodiment of the present invention. The out-cell optical touch device 10 is detachably disposed on a display panel 12 without touch function, and the display panel 12 can provide the touch function by the out-cell optical touch device 10. The out-cell optical touch device 10 can be matched with the smaller-size display panel 12. Generally, the display panel 12 can be the normal liquid crystal panel. As shown in FIG. 1 and FIG. 2, the out-cell optical touch device 10 includes a frame 14, a touch panel 16, at least one signal sensor 18, at least two position sensors 20 and a processor 22. The touch panel 16 is disposed inside a hollow space of the frame 14 to form a detective area, and the frame 14 is detachably disposed on the display panel 12. The detective area is formed on an encircled zone of the frame 14.

The out-cell optical touch device 10 preferably includes two signal sensors 18 respectively disposed on two corresponding corners of the frame 14. The signal sensor 18 may be disposed on a side of the frame 14 since the out-cell optical touch device 10 includes one signal sensor 18. The signal sensor 18 detects touch coordinates of an object 24 within the detective area of the frame 14. The object 24 can be a stylus or user's finger. The out-cell optical touch device 10 includes at least two position sensors 20 respectively disposed on two adjacent sides of the frame 14; further, the out-cell optical touch device 10 preferably includes four position sensors 20 respectively disposed on four sides of the frame 14. The position sensor 20 is substantially disposed on a middle of the side of the frame 14, to effectively detect the distance between each side of the frame 14 and the corresponding side of the display panel 12. The processor 22 is electrically connected to the signal sensor 18 and the position sensors 20. The processor 22 can obtain a linear offset and a rotary offset of the frame 14 relative to the display panel 12 according to the distance detected by the position sensor 20, and transform the touch coordinates into the screen coordinates applied for the display panel 12 by specific transform function for amendment of the control command inputted by the user.

It should be mentioned that the out-cell optical touch device 10 of the present invention can merely utilize the linear offset to transform the touch coordinates into the screen coordinates, or merely utilize the rotary offset to transform the touch coordinates into the screen coordinates, or utilize the rotary offset and the linear offset both to sequentially transform the touch coordinates into the screen coordinates, selectively. The out-cell optical touch device 10 usually executes amendment of the rotary offset for a start, and then executes amendment of the linear offset. Sequence of the offset amendment is not limited to the above-mentioned embodiment, and depends on actual demand.

As shown in FIG. 2, the out-cell optical touch device 10 further can include a timer 26 electrically connected to the processor 22. The processor 22 can utilize the timer 26 to count a predetermined period, and automatically transforms the touch coordinates into the screen coordinates by the specific transform function as waiting for the predetermined period. Besides, the processor 22 can execute automatic amendment according to distance variation of the frame 14 relative to the display panel 12. For example, when the processor 22 determines that the offset (distance) of the frame 14 relative to the display panel 12 is within a predetermined range, position of the frame 14 is tolerable, the processor 22 does not execute the coordinate amendment; when the processor 22 determines that the offset (distance) of the frame 14 relative to the display panel 12 is out of the predetermined range, movement of the frame 14 relative to the display panel 12 is intolerable and results in error of the touch command, the processor 22 can automatically transform the touch coordinates into the correct screen coordinates.

Figure 3:
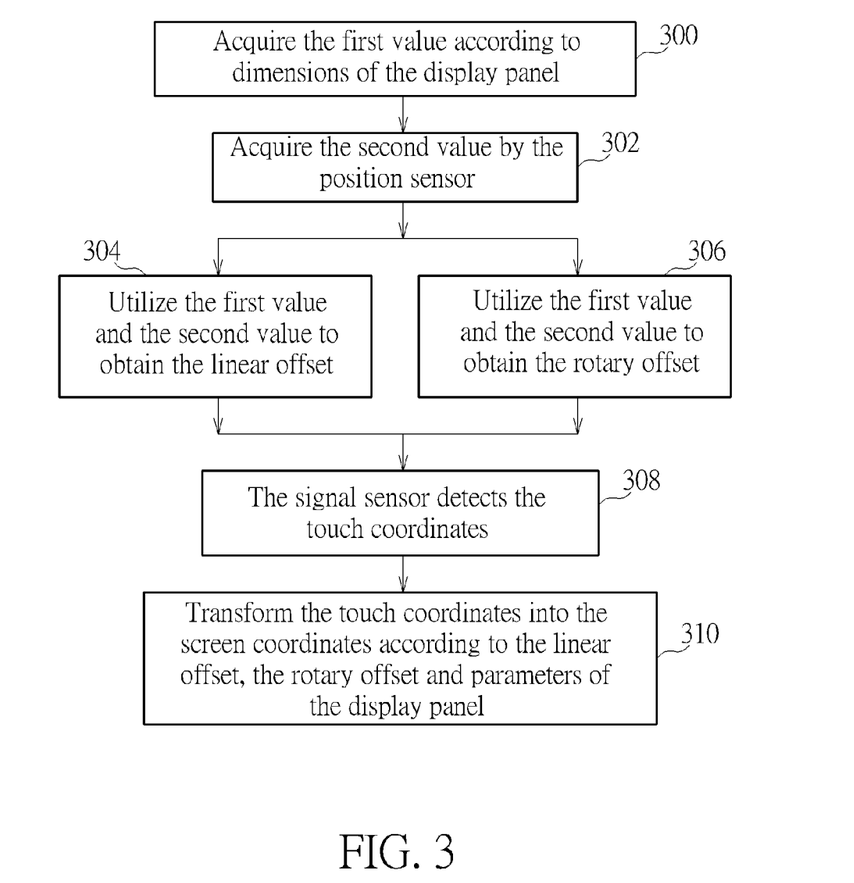
FIG. 3 is a flow chart of the calibrating method according to the embodiment of the present invention.

Please refer to FIG. 3. FIG. 3 is a flowchart of the calibrating method according to the embodiment of the present invention. The calibrating method illustrated in FIG. 3 is suitable for the out-cell optical touch device 10 shown in FIG. 1 and FIG. 2. First, step 300 is executed that the processor 22 acquires the first value according to the dimensions of the display panel 12. The calibrating method of the present invention can effectively acquire the first value regardless of the display panel 12 with known/unknown dimensions. Step 302 is executed that the position sensor 20 detects the distance between the frame 14 and the side of the display panel 12 to acquire the second value. The position sensor 20 can be an optical sensor, which receives an optical signal reflected from the display panel to determine the distance according to the reflected optical intensity. The position sensor 20 can be a capacitive sensor, an inductive sensor, an ultrasonic sensor and a microwave sensor, selectively.

Step 304 and step 306 are executed that the processor 22 utilizes the first value and the second value to respectively obtain the linear offset and the rotary offset, so as to gain position different and angle variation between the frame 14 and the display panel 12. Step 304 and step 306 can be alternatively executed according to actual demand, or can be both executed without sequence consideration. Then, step 308 is executed that the signal sensor 18 detects the touch coordinates of the object 24, and step 310 is executed that the processor 22 transforms the touch coordinates into the screen coordinates according to the linear offset, the rotary offset, resolution and the dimensions of the display panel 12. Therefore, the present invention can rapidly and accurately execute the coordinate amendment without manual touch of calibration points.

Figure 4:
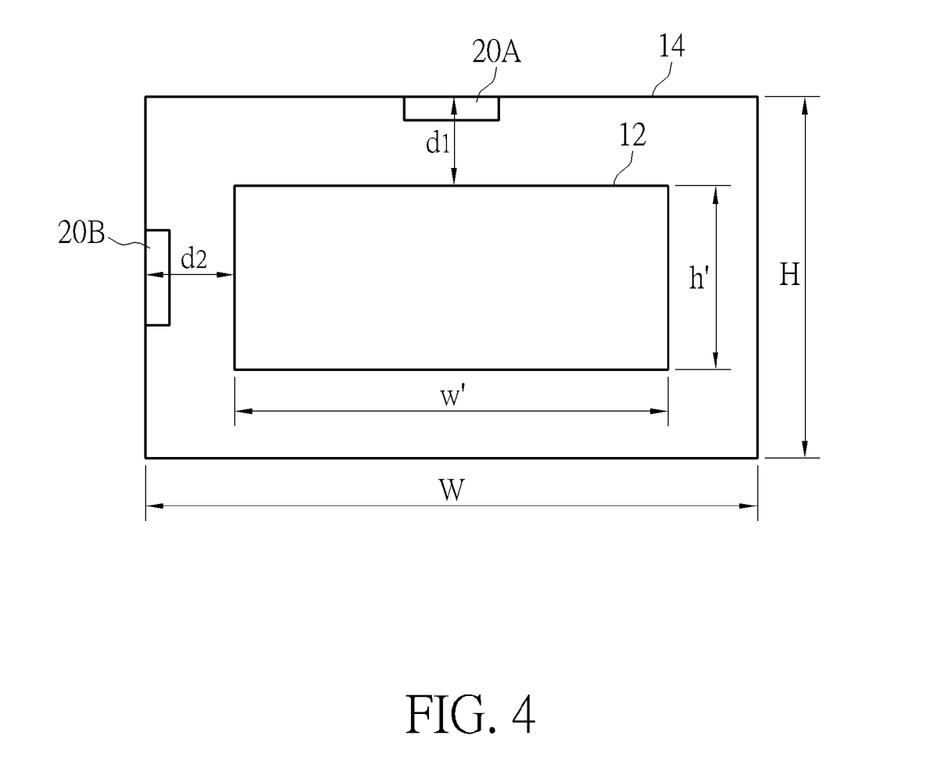
FIG. 4 is a diagram of calculating dimensions of a display panel according to the embodiment of the present invention.

With reference to step 300, the out-cell optical touch device 10 includes at least two position sensors 20A, 20B when the dimensions of the display panel 12 is known. Please refer to FIG. 4. FIG. 4 is a diagram of calculating the dimensions of the display panel 12 according to the embodiment of the present invention. As shown in FIG. 4, the frame 14 has a width W and a height H, the display panel 12 has a width w' and a height h'. The position sensors 20A can acquire the first values d1 according to dimension difference between the frame 14 and the display panel 12. The position sensors 20B can acquire the first values d2 according to the dimension difference between the frame 14 and the display panel 12. The calibrating method utilizes a following formula to acquire the first value:

$$\begin{cases} d1 = \dfrac{W - w'}{2} \\ d2 = \dfrac{H - h'}{2} \end{cases} \quad \text{(formula 1)}$$

The first values d1, d2 are the distances between each side of the frame 14 and the corresponding side of the display panel 12 when the display panel 12 is disposed on a center of the frame 14. The processor 22 acquires the first value and utilizes the first value to execute amendment of the rotary offset and the linear offset. The first values d1, d2 are reference calculated by the processor 22, not data detected by the position sensors 20A, 20B.

Figure 5:
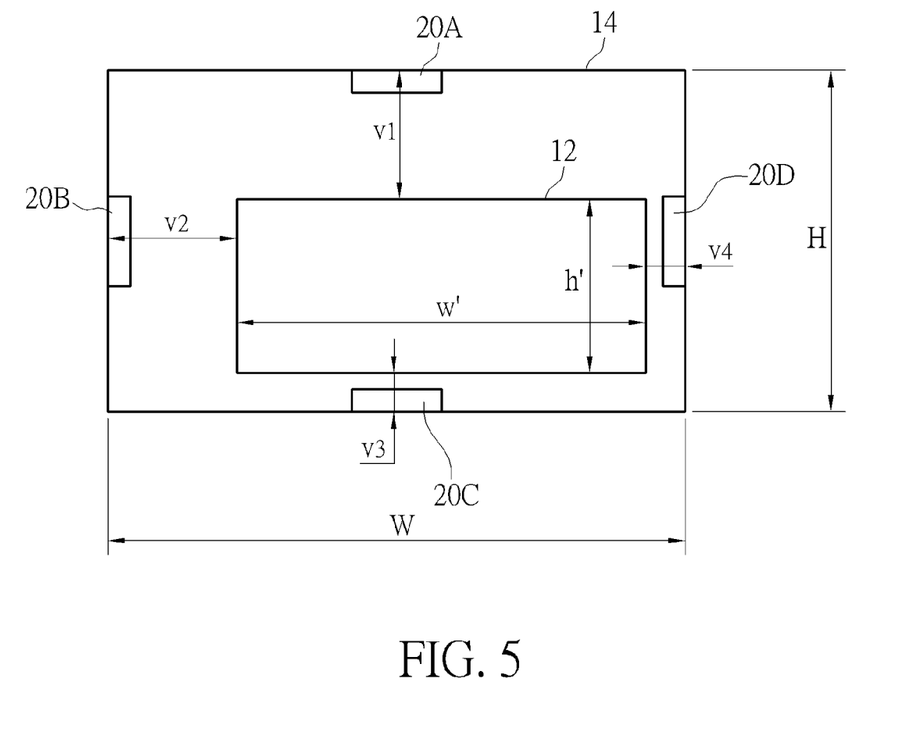
FIG. 5 and FIG. 6 respectively are diagrams of calculating the dimensions of the display panel in different steps according to the embodiment of the present invention.
Figure 6:
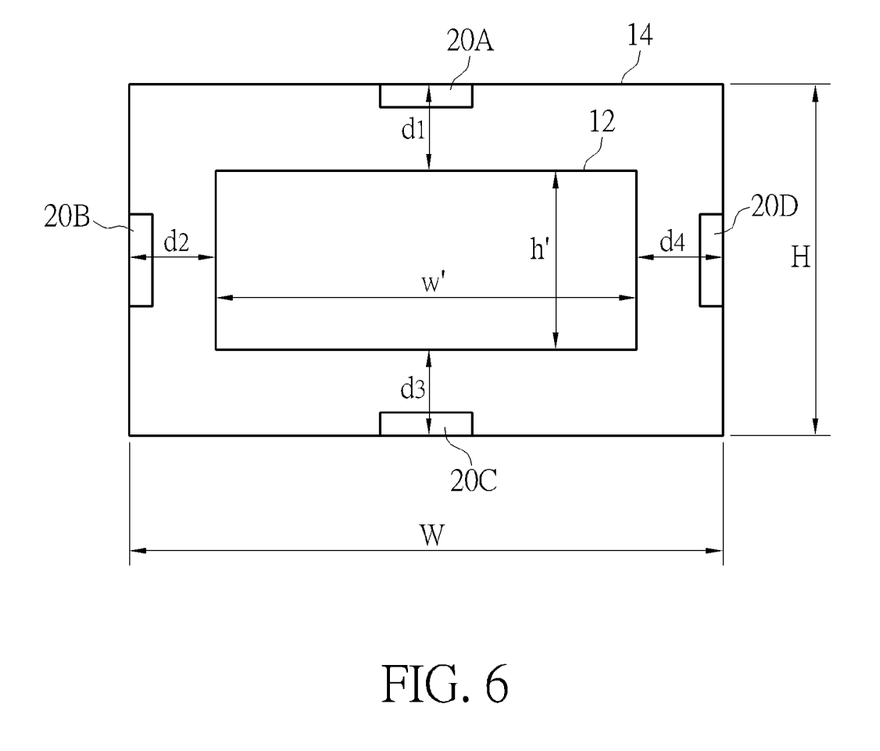

With reference to step 300, the out-cell optical touch device 10 includes at least four position sensors 20A, 20B, 20C and 20D when the dimensions of the display panel 12 is unknown. Please refer to FIG. 5 and FIG. 6. FIG. 5 and FIG. 6 respectively are diagrams of calculating the dimensions of the display panel 12 in different steps according to the embodiment of the present invention. As shown in FIG. 5, the position sensors 20A, 20B, 20C and 20D respectively detect the distances between each side of the frame 14 and the corresponding side of the display panel 12 to obtain the distances v1, v2, v3 and v4. The calibrating method of the present invention utilizes a following formula to acquire the dimensions of the display panel 12:

$$\begin{cases} w' = W - (v2 + v4) \\ h' = H - (v1 + v3) \end{cases} \quad \text{(formula 2)}$$

The processor 22 can subtract the distance detected by the position sensor 20 from the dimensions of the frame 14 to have the width w' and the height h' of the display panel 12. The processor 22 utilizes the formula 1 to acquire the first values d1, d2, d3 and d4 for the reference, or calculates a mean of the distance v1, v3 to acquire the first values d1, d3 and calculates a mean of the distances v2, v4 to acquire the first values d2, d4. It is to say, the calibrating method of the present invention utilizes the four position sensors 20 to obtain the dimensions of the display panel 12, and then utilizes the dimensions of the display panel 12 or the distance detected by the position sensor 20 to acquire the first values d1, d2, d3 and d4. The first values d1, d2, d3 and d4 respectively are the distances between each side of the frame 14 and the corresponding side of the display panel 12 when the display panel 12 is located at the center inside the frame 14.

Figure 7:
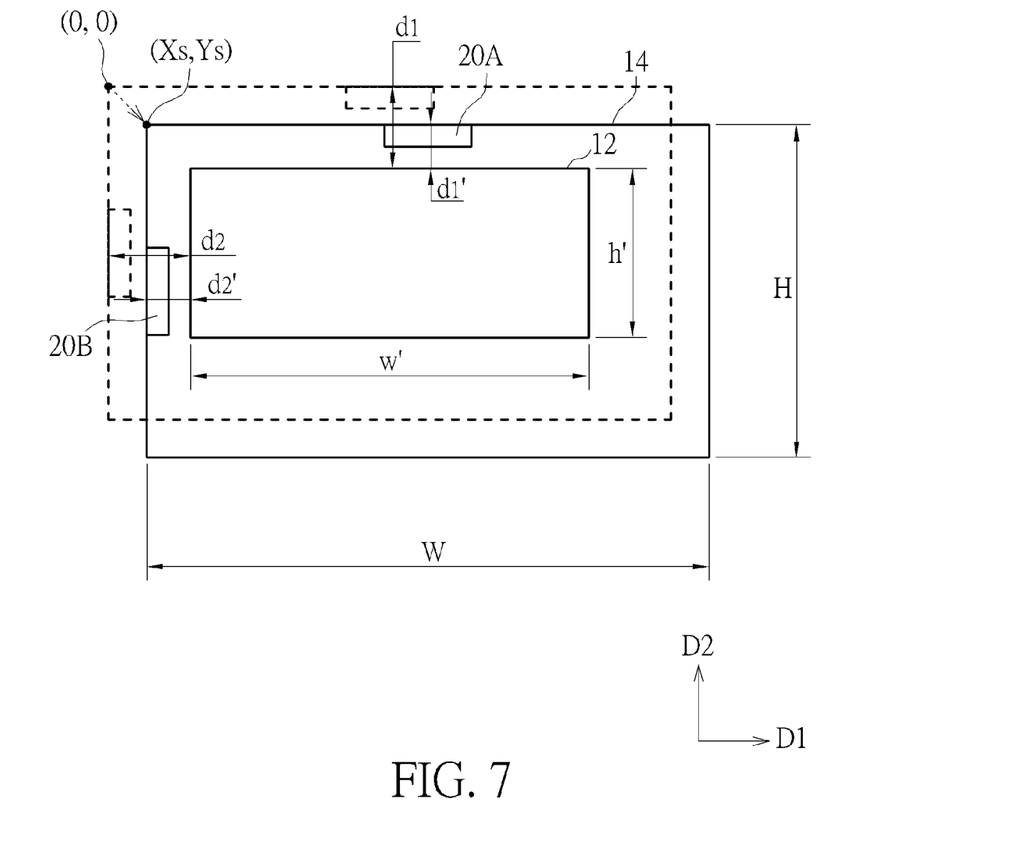
FIG. 7 is a diagram of obtaining a linear offset of a frame according to the embodiment of the present invention.

Please refer to FIG. 7. FIG. 7 is a diagram of obtaining the linear offset of the frame 14 according to the embodiment of the present invention. As shown in FIG. 7, dotted lines represent an ideal position (such as the position shown in FIG. 6) of the frame 14, and full lines represent an actual position of the frame 14. The out-cell optical touch device 10 utilizes at least two position sensors 20A, 20B to calculate the linear offset. The position sensors 20A, 20B detect the distances of the frame 14 relative to the display panel 12 to respectively acquire the second values d1', d2'. The frame 14 has a first linear offset Xs at a first direction D1 and a second linear offset Ys at a second direction D2. The first direction D1 is substantially perpendicular to the second direction D2. With reference to step 302, the calibrating method of the present invention utilizes a following formula to obtain the linear offset:

$$\begin{cases} Xs = d2 - d2' \\ Ys = d1 - d1' \end{cases} \quad \text{(formula 3)}$$

The processor 22 subtracts the second value d2' from the first value d2 to obtain the first linear offset Xs, and subtracts the second value d1' from the first value d1 to obtain the second linear offset Ys. The width w', the height h' and the resolution R of the display panel 12 are known, and the calibrating method utilizes a following formula to transform the touch coordinates into the screen coordinates:

$$\begin{cases} x'' = \dfrac{(x - Xs) \times R}{w'} \\ y'' = \dfrac{(y - Ys) \times R}{h'} \end{cases} \quad \text{(formula 4)}$$

The touch coordinates (x, y) are detected by the signal sensor 18. As step 310 is executed, the processor 22 can transform the touch coordinates (x, y) into the screen coordinates (x", y") by the formula 4, and the screen coordinates (x", y") represent relative position of the object 24 applied for the display panel 12 after amendment of the touch coordinates (x, y).

Figure 8:
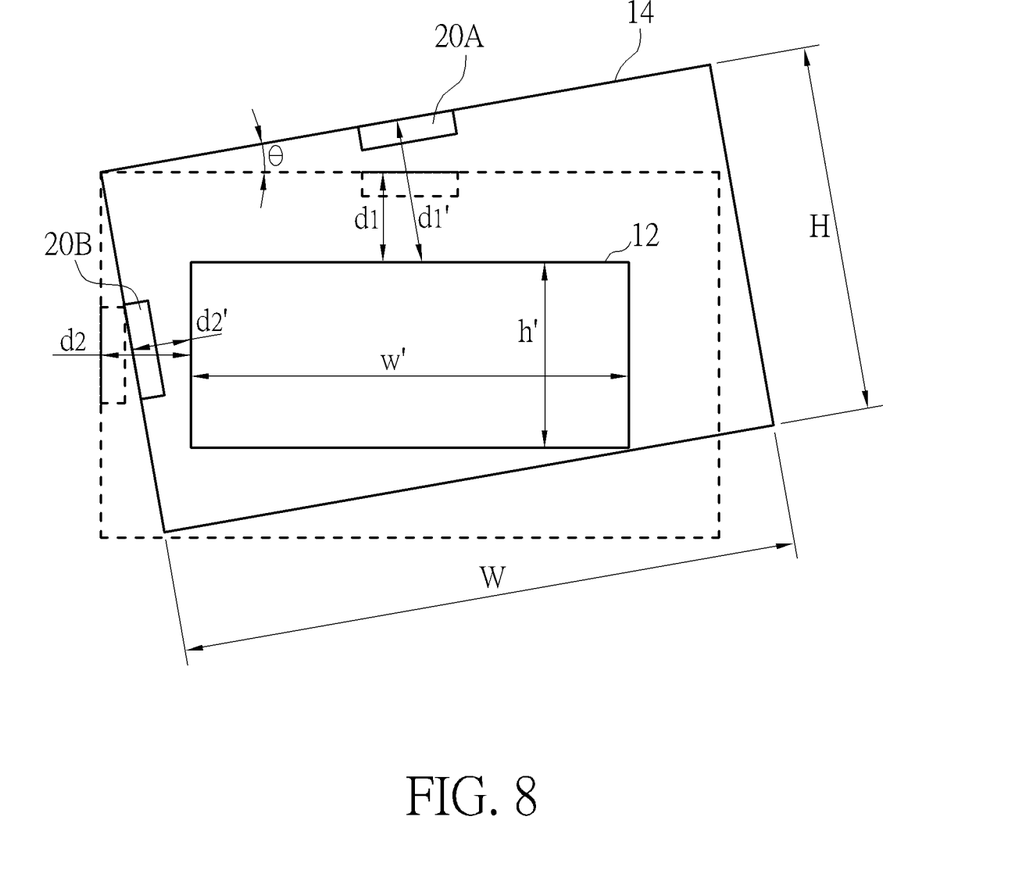
FIG. 8 is a diagram of obtaining a rotary offset of the frame according to the embodiment of the present invention.

Please refer to FIG. 8. FIG. 8 is a diagram of obtaining the rotary offset of the frame 14 according to the embodiment of the present invention. As shown in FIG. 8, the dotted lines represent the ideal position (such as the position shown in FIG. 6) of the frame 14, and the full lines represent the actual position of the frame 14. The out-cell optical touch device 10 utilizes at least two position sensors 20A, 20B to calculate the rotary offset. The position sensors 20A, 20B detect the distances of the frame 14 relative to the display panel 20 to respectively acquire the second values d1', d2'. With reference to step 306, the calibrating method of the present invention utilizes following formulas to obtain the rotary offset and to transform the touch coordinates into the screen coordinates:

$$\theta = \tan^{-1}[2(d2 \times d1' - d1 \times d2')] \quad \text{(formula 5)}$$

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad \text{(formula 6)}$$

As step 310 is executed, the processor 22 utilizes the first values and the second values to calculate the rotary offset θ by the formula 5, and then calculates the amended screen coordinates (x', y') by the formula 6. The present invention not only can use normal affine transform to be the transform function, but also can apply the other transform function to amend the touch coordinates. Application of the transform function is not limited to the above-mentioned embodiment, and depends on design demand.

When the rotary offset and the linear offset are existed between the frame 14 and the display panel 12, the linear offset (Xs, Ys) and the rotary offset θ are calculated according to the second values d1', d2' detected by the position sensors 20A, 20B applied to the formula 3 and the formula 5. In the preferred embodiment, the present invention utilizes the formula 6 to calculate the screen coordinates (x', y') with rotary amendment according to the touch coordinates (x, y) and the rotary offset θ, and then utilizes the formula 4 to calculate the screen coordinates (x", y") with linear amendment according to the amended screen coordinates (x', y'), the linear offset (Xs, Ys), the with w', the height h' and the resolution R of the display panel 12. The initial touch coordinates (x, y) is transformed into the screen coordinates (x", y") for accurately representing position of the object 24 over the display panel 12. The calibrating method of the present invention is not limited to the above-mentioned procedures of executing the rotary amendment and then the linear amendment, but further can execute the linear amendment and then the rotary amendment, probably merely execute the linear amendment or the rotary amendment.

The out-cell optical touch device can be detachably disposed on the display panel. The out-cell optical touch device is difficult to be accurately disposed on the center of the display panel due to manual assembly. As the offset is existed between the out-cell optical touch device and the display panel, the present invention can automatically transform the touch coordinates detected by the out-cell optical touch device into the screen coordinate applied for the display panel, which means the coordinate amendment is actuated without manual operation. The out-cell optical touch device of the present invention disposes two or four position sensors on sides of the frame, and each position sensor detects the distance between each side of the frame and the corresponding side of the display panel. The calibrating method of the present invention calculates the linear offset and the rotary offset of the frame relative to the display panel, and transforms the touch coordinates into the screen coordinates according to the linear offset, the rotary offset and parameters (such as the dimensions and the resolution) of the display panel. The control command (the touch coordinates which is manually inputted) detected by the out-cell optical touch device can be transformed and conform to the correct position (the screen coordinates which is automatically generated) displayed on the display panel.

Comparing to the prior art, the out-cell optical touch device and the related calibrating method of the present invention utilizes the plurality of position sensors to measure the dimensions of the display panel and transforms the coordinates automatically. The coordinate amendment is actuated without manual operation by touching the calibration points. Therefore, the present invention can effectively prevent artificial error to increase precision of the coordinate amendment, and provide an automatic amendment function for preferred operational convenience of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibrating method applied to an out-cell optical touch device, the method being suitable for the out-cell optical touch device having at least one signal sensor and at least two position sensors, the position sensors being respectively disposed on two adjacent sides of a frame of the out-cell optical touch device, the calibrating method comprising:

acquiring a first value according to dimensional difference between the frame and a display panel;
detecting a distance between the frame and a side of the display panel to acquire a second value;
utilizing the first value and the second value to obtain an offset; and
transforming touch coordinates detected by the signal sensor into screen coordinates applied for the display panel according to the offset.

2. The calibrating method of claim 1, wherein the calibrating method utilizes a following formula to acquire the first value:

$$\begin{cases} d1 = \dfrac{W - w'}{2} \\ d2 = \dfrac{H - h'}{2} \end{cases}$$

wherein
W, H respectively are a width and a height of the frame;
w', h' respectively are a width and a height of the display panel; and
d1, d2 are the first values respectively detected by the position sensors.

3. The calibrating method of claim 1, wherein an amount of the position sensor is four, the calibrating method of acquiring the first value according to the dimensions of the display panel further comprises:
utilizing the four position sensors disposed on four sides of the frame to acquire distances between each side of the frame and a corresponding side of the display panel;
obtaining the dimensions of the display panel according to the distances; and
acquiring the first value according to dimension difference between the frame and the display panel.

4. The calibrating method of claim 3, wherein the calibrating method utilizes a following formula to obtain the dimensions of the display panel:

$$\begin{cases} w' = W - (v2 + v4) \\ h' = H - (v1 + v3) \end{cases}$$

wherein
w', h' respectively are a width and a height of the display panel;
W, H respectively are a width and a height of the frame; and
v1, v2, v3, v4 respectively are distances acquired by the four position sensors.

5. The calibrating method of claim 1, wherein the offset is a linear offset, an amount of the position sensor is two, and the calibrating method utilizes a following formula to obtain the offset:

$$\begin{cases} Xs = d2 - d2' \\ Ys = d1 - d1' \end{cases}$$

wherein
Xs, Ys respectively are a first linear offset at a first direction and a second linear offset at a second direction, the first direction is substantially perpendicular to the second direction;
d1, d2 are the first values respectively detected by the position sensors; and
d1', d2' are the second values respectively detected by the position sensors.

6. The calibrating method of claim 5, wherein the calibrating method utilizes a following formula to transform the touch coordinates into the screen coordinates:

$$\begin{cases} x'' = \dfrac{(x - Xs) \times R}{w'} \\ y'' = \dfrac{(y - Ys) \times R}{h'} \end{cases}$$

wherein
(x, y) are the touch coordinates;
w', h' respectively are a width and a height of the display panel;
R is resolution of the display panel; and
(x'', y'') are the screen coordinates.

7. The calibrating method of claim 1, wherein the offset is a rotary offset, an amount of the position sensor is two, and the calibrating method utilizes a following formula to obtain the offset:

$$\theta = \tan^{-1}[2(d2 \times d1' - d1 \times d240)]$$

wherein
d1, d2 are the first values respectively detected by the position sensors;
d1', d2' are the second values respectively detected by the position sensors; and
θ is the rotary offset.

8. The calibrating method of claim 7, wherein the calibrating method utilizes a following formula to transform the touch coordinates into the screen coordinates:

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix}$$

wherein
(x, y) are the touch coordinates; and
(x'', y'') are the screen coordinates.

9. The calibrating method of claim 1, further comprising:
determining whether the distance is within a predetermined range; and
transforming the touch coordinates into the screen coordinates when the distance is out of the predetermined range.

10. The calibrating method of claim 1, further comprising:
transforming the touch coordinates into the screen coordinates as waiting for a predetermined period.

11. The calibrating method of claim 1, wherein the offset comprises a rotary offset and a linear offset, the calibrating method transforms the touch coordinates into the screen coordinates according to the rotary offset and the linear offset in sequence.

12. An out-cell optical touch device comprising:
a frame for being movably disposed on a display panel, a detective area being formed on an encircled zone of the frame;
at least one signal sensor disposed on the frame to detect touch coordinates of an object within the detective area;
at least two position sensors respectively disposed on adjacent sides of the frame to detect distances between the frame and sides of the display panel; and a processor electrically connected to the signal sensor and the position sensors, the processor acquiring a first value according to dimensional difference between the frame and a display panel, acquiring a second value by the distances, obtaining an offset of the frame relative to the display panel according to the distances via the first value and the second value, and transforming the touch coordinates into screen coordinates applied for the display panel according to the offset.

13. The out-cell optical touch device of claim 12, wherein each position sensor is substantially disposed on a middle of the corresponding side of the frame.

14. The out-cell optical touch device of claim 12, wherein the out-cell optical touch device further comprises at least four position sensors respectively disposed on four sides of the frame, each position sensor detects the distances between each side of the frame and a corresponding side of the display panel.

15. The out-cell optical touch device of claim 12, wherein the processor utilizes the position sensor to obtain the dimensions of the display panel.

16. The out-cell optical touch device of claim 12, wherein the offset is a linear offset, the processor utilizes the first value and the second value to obtain the linear offset, so as to transform the touch coordinates into the screen coordinates according to the linear offset.

17. The out-cell optical touch device of claim 12, wherein the offset is a rotary offset, the processor utilizes the first value and the second value to obtain the rotary offset, so as to transform the touch coordinates into the screen coordinates according to the rotary offset.

18. The out-cell optical touch device of claim 12, wherein the offset comprises a rotary offset and a linear offset, the processor transforms the touch coordinates into the screen coordinates according to the rotary offset and the linear offset.

19. The out-cell optical touch device of claim 12, wherein the out-cell optical touch device further comprises a timer electrically connected to the processor, the processor utilizes the timer to count a predetermined period, and transforms the touch coordinates into the screen coordinates as waiting for the predetermined period.

* * * * *